March 10, 1964 W. J. WHITE 3,124,005
DYNAMIC BALANCING APPARATUS
Filed March 2, 1962 5 Sheets-Sheet 1

INVENTOR.
WILLIAM J. WHITE
BY
AGENT

March 10, 1964 W. J. WHITE 3,124,005
DYNAMIC BALANCING APPARATUS
Filed March 2, 1962 5 Sheets-Sheet 2

INVENTOR.
WILLIAM J. WHITE
BY George E. Manias
AGENT

March 10, 1964

W. J. WHITE 3,124,005

DYNAMIC BALANCING APPARATUS

Filed March 2, 1962

INVENTOR.
WILLIAM J. WHITE
BY
George E. Manias
AGENT

INVENTOR.
WILLIAM J. WHITE
BY
George E. Manias
AGENT

3,124,005
DYNAMIC BALANCING APPARATUS
William J. White, Columbus, Ohio, assignor to
International Research and Development Corp.
Filed Mar. 2, 1962, Ser. No. 177,103
9 Claims. (Cl. 73—471)

The present invention relates to dynamic balancing apparatus. More particularly the present invention relates to unitary dynamic balancing apparatus which supports and drives a rotor for determining the imbalance of the said rotor.

The present invention finds particular utility in supporting rotors having a wide diameter compared with the length of the rotational axis. Examples of rotors of this type are grinding wheels, some turbine rotors, large gears and the like.

The principal objects of this invention include:

To provide a balancing support stand which utilizes a novel flexible reeds structure for supporting a rotor;

To provide a balancing support stand which utilizes an articulated drive shaft for driving a rotor;

To provide a balancing support stand that will accommodate rotors at relatively high, intermediate and relatively low rotational speeds;

To provide a novel base frame which automatically aligns a pair of flexible reeds and an articulated drive shaft in a common vertical plane;

To provide a unitary, compact balancing support stand having a relatively low silhouette; and To provide a damping system that may be used (1) to lock a pair of flexible reeds in place when a rotor is to be attached to the balancing support stand, and (2) to limit the range of oscillation of a pair of flexible reeds.

These and other objects and advantages will become apparent from the following detailed description by reference to the accompanying drawings in which.

According to the present invention a compact, unitary balancing support stand is provided which supports and drives a rotor whose imbalance is to be investigated. The present balancing support stand includes a deflectable supporting and driving structure to which a rotor is secured. The rotor is driven thereby whereupon any imbalance will produce forces which cause the supporting and driving structure to oscillate. Vibration transducer means is provided to convert the mechanical vibrations into electrical signals corresponding to the imbalance of the rotor. Damping means is also provided to limit the range of oscillations.

More particularly the present invention provides (a) a pair of flexible reeds secured at one end to a base and at the other end to a support block and (b) a drive shaft, disposed centrally between the pair of flexible reeds, which extends through and is pivotally journaled to the support block. The drive shaft and the pair of flexible reeds are arranged so that their axes normally lie in a common vertical plane. An articulating means, aligned with the base, is secured to the lower end of the drive shaft.

The pair of flexible reeds is mounted at each end in a cantilevered manner so that application of forces will cause their flexure in a single direction, i.e., perpendicular to the common vertical plane defined by their axes. Further the reeds flex about a point on their axes which is aligned with the articulating means.

Thus the pair of flexible reeds and the support block oscillate in unison with the drive shaft in a direction substantially perpendicular to the common vertical plane.

*General Arrangement*

Figure 2:
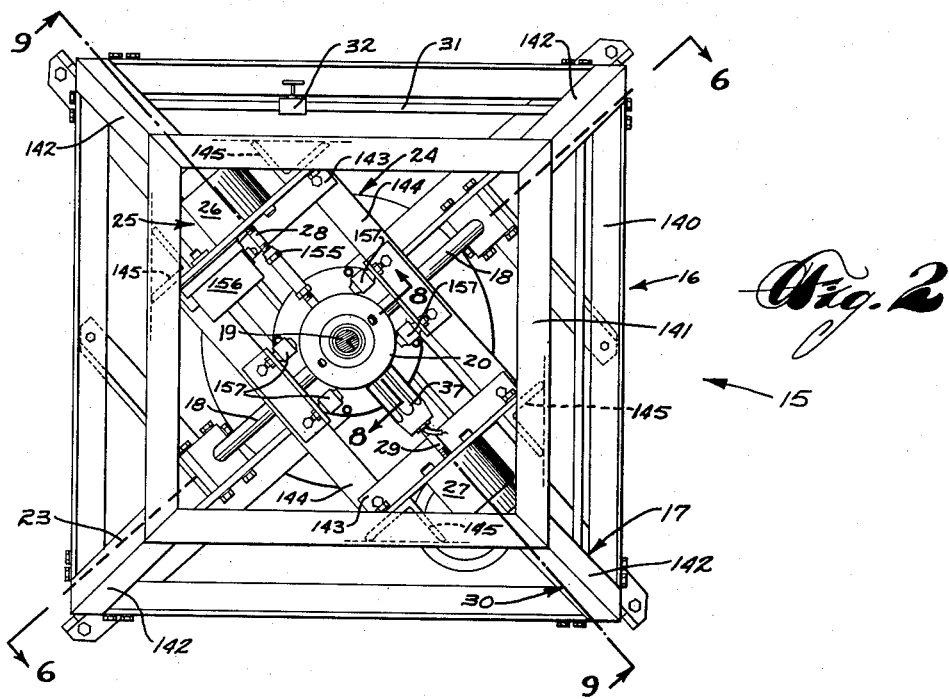
FIGURE 2 is a plan view taken along the line 2—2 of FIGURE 1 further illustrating the present balancing support stand.
Figure 1:
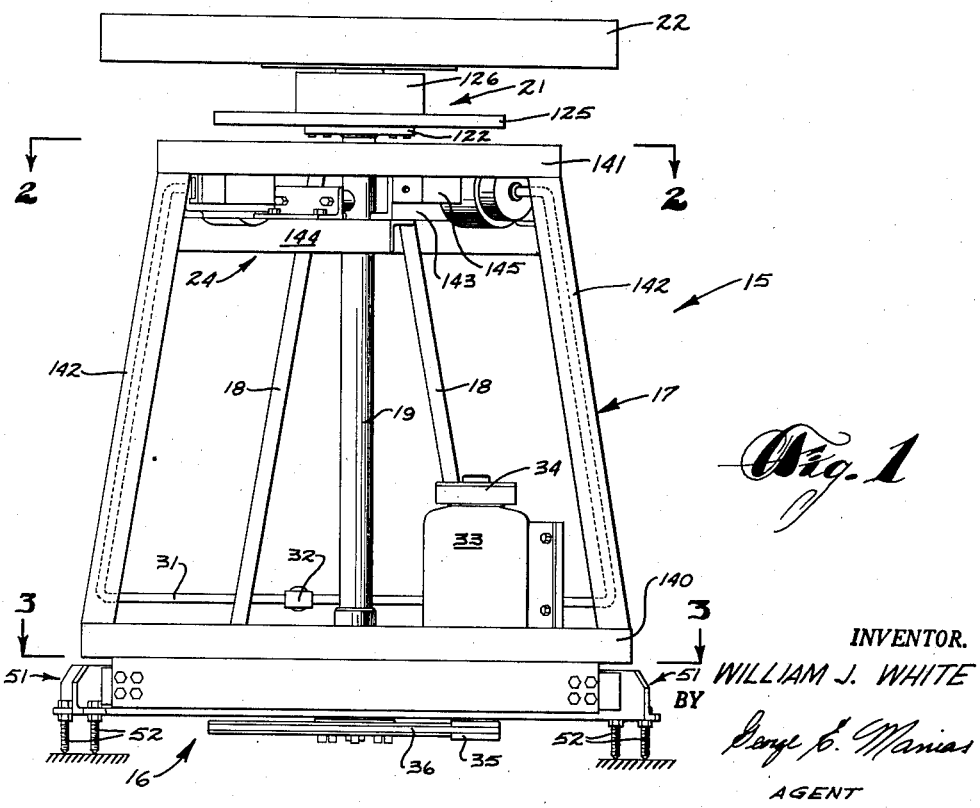
FIGURE 1 is a side elevation view of the present balancing support stand.

The present balancing support stand, generally designated by the numeral 15, is illustrated in FIGURES 1 and 2. In general, the balancing support stand 15 includes a base frame 16 and a support frame 17.

Supported by the base frame 16 is a pair of flexible reeds 18 and an articulated drive shaft 19 positioned centrally between the pair of flexible reeds 18. A support block 20 (see FIGURE 2) connects the ends of the flexible reeds 18 and has the articulated drive shaft 19 extending therethrough. Mounting means 21 (see FIGURE 1) is secured above the support block 20 to the articulated drive shaft 19. A rotor such as grinding wheel 22 is shown secured to the mounting means 21 and illustrates the manner in which a rotor is supported by the balancing support stand 15.

As best illustrated in FIGURE 2, the axes of the flexible reeds 18 and the articulated drive shaft 19 normally lie in a common vertical plane represented by the dashed line at 23.

The support frame 17 is secured to the base frame 16 and extends thereabove to support a secondary frame 24 at its upper end. The secondary frame 24 supports damping means 25 which includes a first dashpot 26 and a second dashpot 27 having piston shafts 28, 29 respectively which are directed toward the support block 20. The piston shafts 28, 29 are aligned on a common longitudinal axis, indicated by the dash-dot line at 30, which is substantially perpendicular to the common vertical plane 23. Conduit means 31 connects the first and second dashpots 26, 27 and provides communication therebetween for a working fluid. Valve means 32 is provided in conduit means 31 for restricting the flow of the working fluid.

A vibration transducer element 37 is secured to the support block 20 and serves to convert to electrical signals the mechanical vibrations which result from rotation of the rotor 22. Any suitable vibration transducer may be used. For example, the transducer disclosed in U.S. Patent 2,754,435, by T. Ongaro, assigned to the assignee of the present invention, which is a velocity-type transducer. Preferably the vibration transducer element 37 is secured to the support block 20 so that it is parallel to the common longitudinal axis 30.

The base frame 16 also vertically supports a drive means such as a variable speed motor 33 having brake means secured to the upper end of its shaft and a drive pulley 35 secured to the lower end of its shaft. Brake means 34 serves to rapidly stop the motor 33 and hence the articulated drive shaft 19, thereby reducing the time required to balance a rotor. The drive pulley 35 is connected to the articulated drive shaft 19 by means of a drive belt 36.

A detailed description of the various components hereinabove listed and their interrelations will now follow.

Base Frame 16

Figures 3, 4, 5:
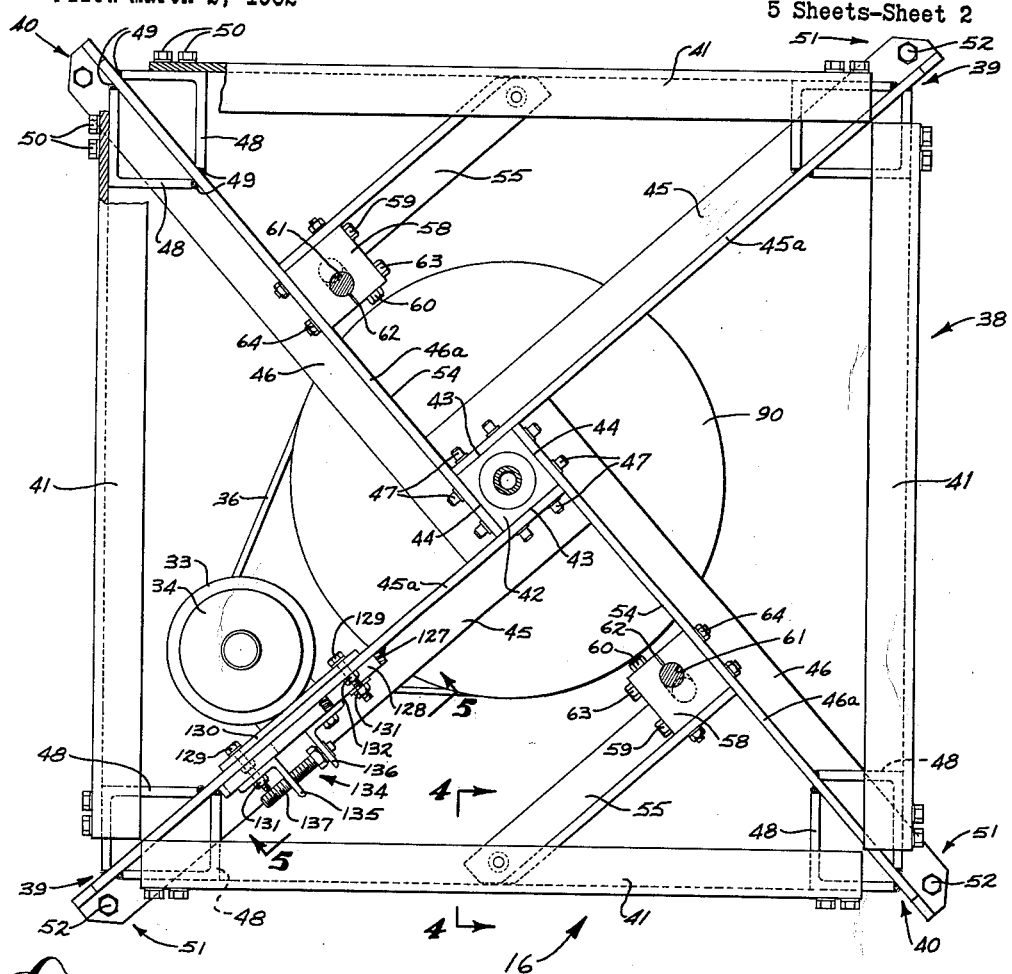
FIGURE 3 is a cross-sectional view taken along the line 3—3 of FIGURE 1 illustrating a base frame of the present invention.
FIGURE 4 is a cross-sectional view taken along the line 4—4 of FIGURE 3 further illustrating the base frame of FIGURE 3.
FIGURE 5 is a side view as viewed along the line 5—5 of FIGURE 3 illustrating a drive means and positioning means therefor.

The base frame 16, illustrated in FIGURES 3 and 4, comprises a square peripheral frame 38 having pairs of diagonally opposite corners 39, 40. The square peripheral frame 38 is preferably comprised of steel L-shaped angle members 41 which are positioned in the manner illustrated.

A square journal block 42 is positioned in the center of the peripheral frame 38. The square journal block 42 has opposite sides 43, 44.

The base frame 16 also includes a first pair of spaced apart, substantially parallel brace elements 45 extending inwardly from one pair of diagonally opposite corners 39 and a second pair of spaced apart, substantially parallel brace elements 46 extending inwardly from the other pair of diagonally opposite corners 40. The inner ends of the first and second pair of brace elements 45, 46 are secured to the opposite sides 43, 44 respectively preferably by means of bolts 47.

The brace elements 45, 46 preferably comprise L-shaped angle members. Each of the brace elements 45, 46 has a pair of L-shaped angle clips 48 secured to the opposite sides of a vertical leg 45a, 46a preferably by means of spot welds 49. The legs of the L-shaped angle clips 48 are of unequal length so that when they are welded in opposed relation, as illustrated, they form a rectangular configuration having perpendicularly oriented sides which register with the square peripheral frame 38. The L-shaped clips 48 are secured to the square peripheral frame 38 by any suitable means such as a plurality of bolts 50.

The brace elements 45, 46 have an outer end extending beyond the square peripheral frame 38 and through which extend bolts 52. The bolts 52 serve to maintain the base frame 16 spaced from the supporting surface and serve as a means for leveling the balancing support stand 15 (see FIGURE 1).

The vertical legs 46a of the brace elements 46 present confronted faces 54 from which support angles 55, positioned equidistant from the journal block 42, extend perpendicularly. One end of the support angles 55 is secured to the confronted faces 54 by means of welding. The other end of the support angles 55 (see FIGURE 4) is secured to the angle members 41 of the peripheral frame 38 by means of bolts 56 extending through a spacing sleeve 57. The spacing sleeve 57 is interposed between the support angle 55 and the angle member 41 and maintains the support angle 55 substantially parallel to the angle member 41.

Figure 6:
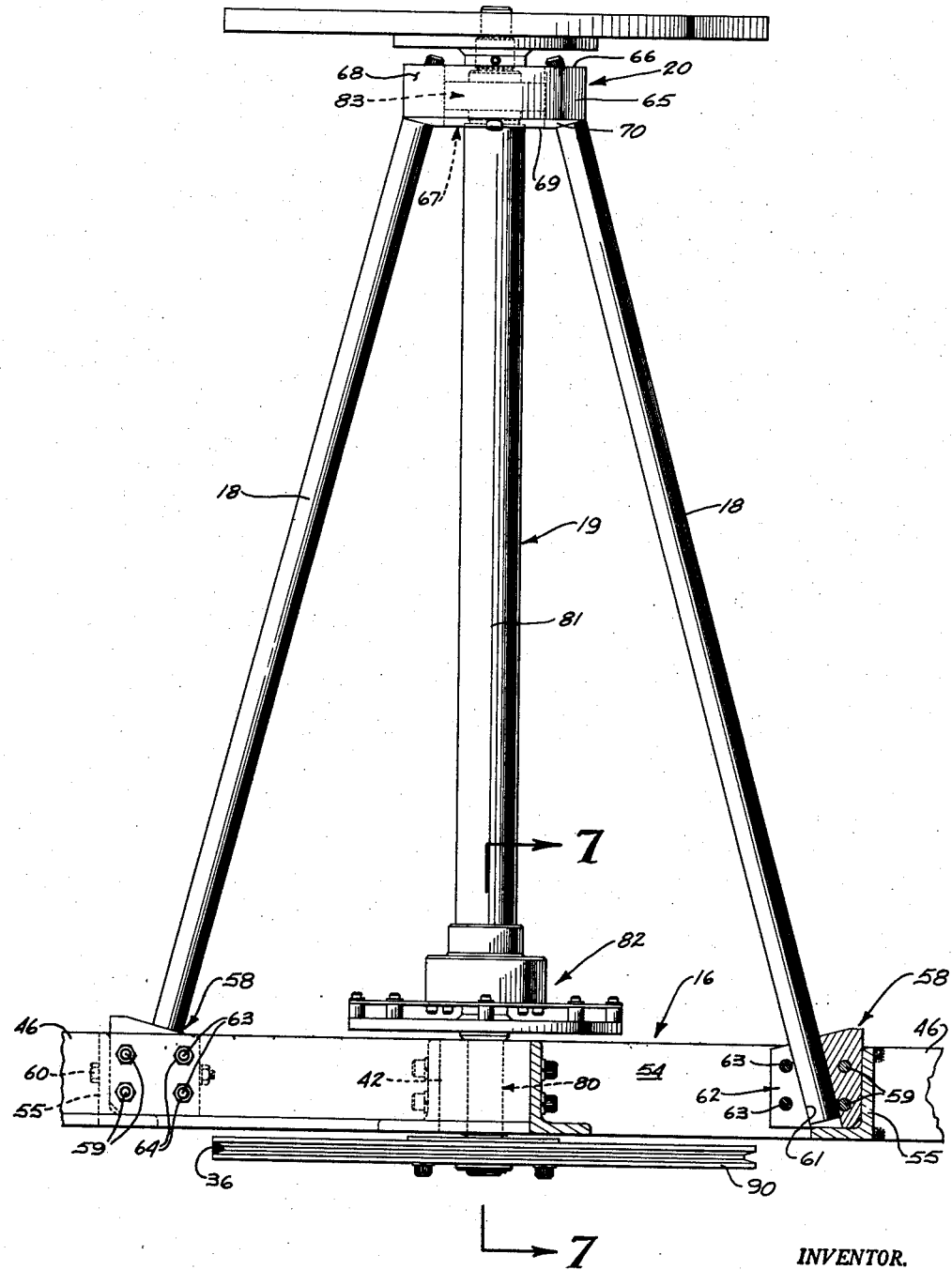
FIGURE 6 is a view, partly in cross-section, along the line 6—6 of FIGURE 2 illustrating the flexible reeds support and drive shaft of the present invention.

Referring to FIGURES 3 and 6, a pair of clamping blocks 58, preferably of the same size as the square journal block 42, is positioned, one each, at the juncture of the brace elements 46 and the support angles 55. Each of the clamping blocks 58 is secured to the confronted faces 54 of the brace elements 46 and to the support angles 55 by means of bolts 59 and 60 respectively. The clamping blocks 58 have a bore 61 which is inclined toward the journal block 42 and within which one end of the flexible reeds 18 is inserted. The clamping blocks 58 also have a cut 62 in one face which communicates with the bore 61. Clamping fasteners such as bolts 63 extend longitudinally through the clamping block 58, the cut 62 and the vertical leg 46a and cooperate with the nuts 64 to non-rotatably clamp the ends of the flexible reeds 18 in the bore 61.

Support Block 20

Figure 8:
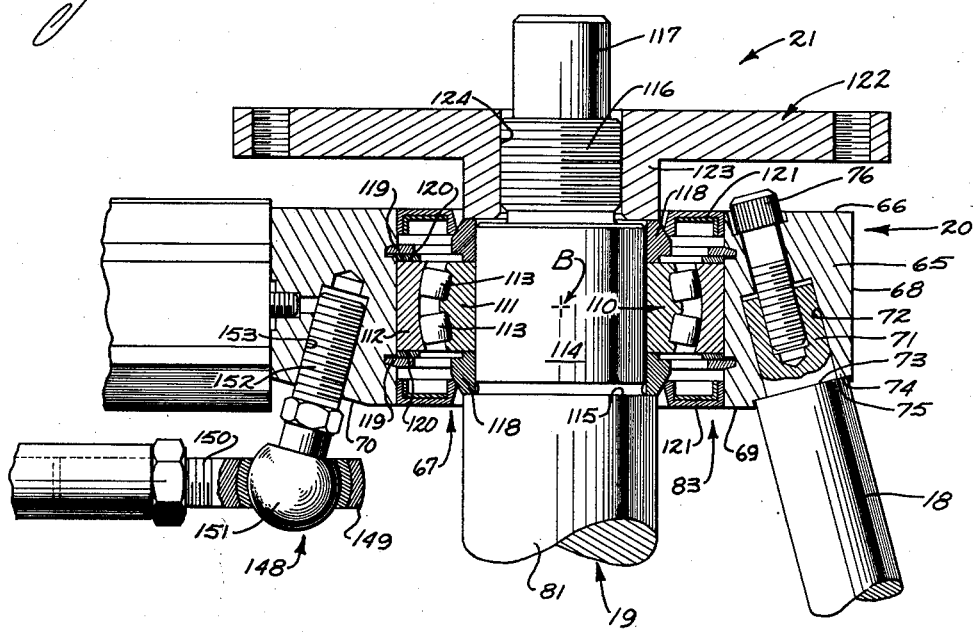
FIGURE 8 is a cross-sectional view taken along the line 8—8 of FIGURE 2 illustrating a support block of the present invention.

The support block 20, best illustrated in FIGURES 6 and 8, comprises an annular body 65 having an upper wall 66, a central bore 67 longitudinally therethrough, a peripheral wall 68, and a bottom wall 69 having a peripheral inclined surface 70.

Flexible Reeds 18

Each of the flexible reeds 18 preferably comprises a reed having a substantially uniform spring constant in all directions of bending. Further, the flexible reeds 18 should have sufficient column strength to support the weight of the rotor that is to be balanced. Steel rods which have a circular cross-section possess these characteristics. Thus the flexible reeds 18 preferably comprise steel rods having a circular cross-section, as for example, drill rod.

It should be evident then that a proper choice of physical properties and of diameter will result in a flexible reed having the desired spring constant and sufficient column strength. It is also preferable that the reeds 18 both have substantially identical spring constants and column strengths. In a specific embodiment of the present balancing support stand the flexible reeds each were one inch in diameter and had an over-all length of thirty-five inches.

Referring to FIGURE 6, the flexible reeds 18 are secured at one end in the clamping blocks 58 as heretofore described. The flexible reeds project from the clamping blocks 58 in a common vertical plane and are inclined so that they converge toward the support block 20.

The flexible reeds 18 are rigidly secured at the other end to the support block 20. In FIGURE 8 there is illustrated the connection between one of the reeds 18 and the support block 20—the other reed 18 being similarly rigidly secured to the support block 20.

The flexible reed 18 has a reduced end 71 inserted in an end receiving bore 72 in the annular body 65 and a shoulder 73 abutting a bottom shoulder 74 of a counterbore 75. Fastener means such as machine screw 76 extends through the upper wall 66 of the support block 20 and is threadedly engaged in the reduced end 71. The length of the reduced end 71 is shorter than the length of the end receiving bore 72. Thus when the screw 76 is tightened the shoulder 73 is rigidly held against the bottom shoulder 74 of the counterbore 75.

The flexible reeds 18 provide a cantilever support which, under the application of forces, is caused to flex in a single direction, i.e., perpendicular to the common vertical plane defined by their axes. Each of the reeds 18 is in effect a cantilevered spring-like element which deflects about its mount (clamping blocks 58) at one end when transverse forces are applied to the other end. The transverse forces in this instance are provided by the imbalance of a rotating rotor. It should be evident that a single reed may deflect in all directions. However, when a pair of reeds is utilized, as in the instant case, the direction of possible deflection is substantially limited to a single direction, i.e., perpendicular to the common vertical plane.

Articulated Drive Shaft 19

Figure 7:
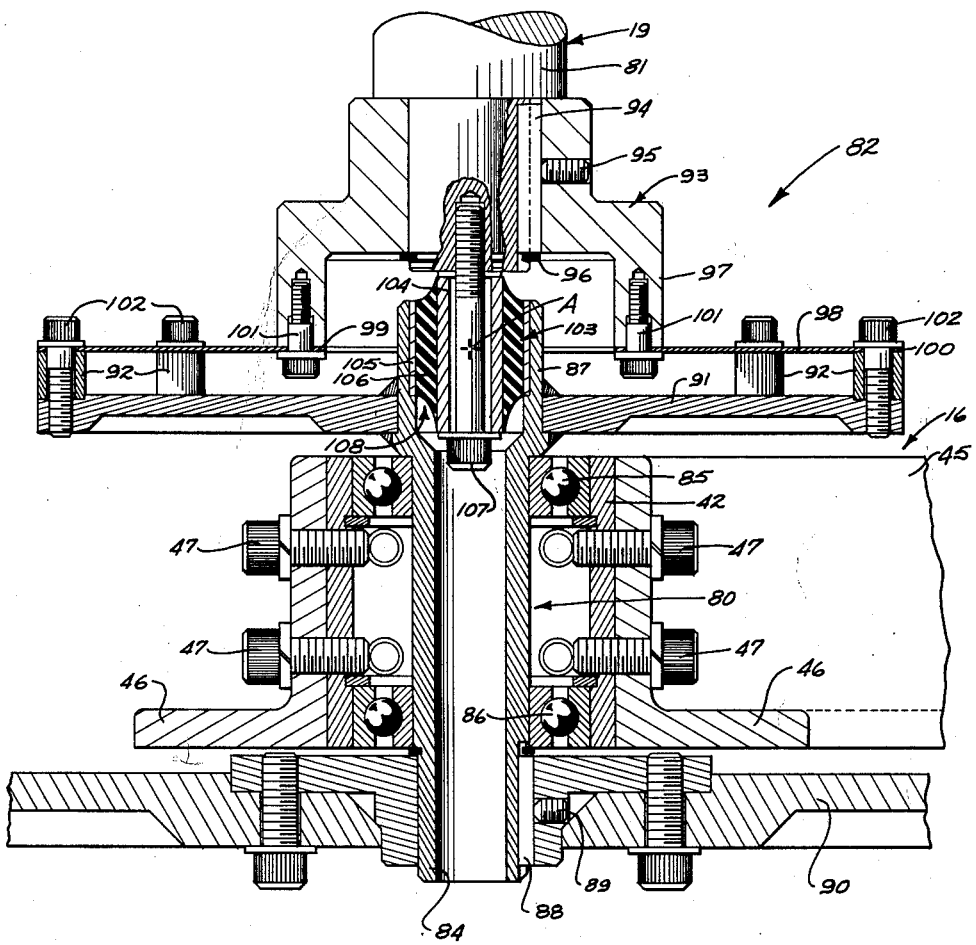
FIGURE 7 is a cross-sectional view taken along the line 7—7 of FIGURE 6 illustrating a square journal block and a flexible coupling means of the present invention.

The articulated drive shaft 19, illustrated in FIGURES 6, 7 and 8, comprises a fixed segment 80 journaled to the base frame 16, a rocking segment 81 extending thereabove through the support block 20, flexible coupling means 82 connecting the fixed segment 80 and the rocking segment 81 and pivotal journal means 83 connecting the rocking segment 81 to the support block 20. The rocking segment 81 is positioned so that its axis and the axes of the flexible reeds 18 normally lie in the common vertical plane 23 (see FIGURE 2).

Referring to FIGURE 7, the fixed segment 80 preferably comprises a tubular member 84 journaled to the bearing block 42 by means of journals 85, 86. The tubular member 84 has an enlarged end 87 above the journal block 42. Secured to the other end of the tubular member 84, by means of a key 88 and set screw 89, is a driven pulley 90 which is connected to the drive pulley 35 of the motor 33 by means of the drive belt 36. The fixed segment 80 is thus journaled to the base frame for rotation about a fixed vertical axis lying in the common vertical plane 23 (FIGURE 2).

Still referring to FIGURE 7, the flexible coupling means 82 includes a radial flange 91 secured above the base frame 16 to the enlarged end 87 of the tubular member 84. The radial flange 91 has a plurality of spacer elements 92 positioned adjacent its outer rim. A hub 93 is secured to the end of the rocking segment 81 by means of key 94, set screw 95 and snap ring 96 for example. The hub 93 has a tubular portion 97, of larger diameter, extending longitudinally therefrom.

An annular diaphragm 98, having an inner edge 99 and an outer edge 100, is secured at the inner edge 99 to the tubular portion 97 by means of screws 101 and is secured at the outer edge 100 to the spacer elements 97 by means of screws 102 extending therethrough into the radial flange 91. The annular diaphragm 98 acts as flexible coupling element which permits the articulated drive shaft 19 to bend about a rocking point indicated at A—the rocking point A being positioned between the journals, i.e., journals 85, 86 and the pivotal journal means 83. (See FIGURE 6.)

The flexible coupling means 82 further includes an elastomer element 103 which connects the end of the rocking segment 81 to the fixed segment 80. The elastomer element 103 serves to limit the slight axial movement of the rocking segment permitted by the annular diaphragm 98. The elastomer element 103 further serves as a safety device which temporarily accepts the driving torque of the annular diaphragm 98 when and if the annular diaphragm 98 should fail.

The elastomer element 103 comprises an inner tubular element 104, an outer tubular element 105 and a tubular plug 106 of elastomeric material.

The inner tubular element 104 is rigidly secured to the end of the rocking segment 81 by means of a bolt 107. The bolt 107 extends through the inner tubular element 104 and is threadedly engaged in the end of the rocking segment.

The outer tubular element 105 resides in the enlarged end 87 of the fixed segment 80. The outer tubular element 105 is of such size that it must be forced into the enlarged end 87 thereby being rigidly secured therein.

The tubular plug 106 fills the annular recess formed between the inner tubular element 104 and the outer tubular element 105 and is bonded to the surfaces thereof. It should be noted that the elastomer element 103 is preferably positioned with respect to the annular diaphragm 98 whereby its center of bending coincides with the rocking point A.

Referring to FIGURE 8, the other end of the rocking segment 81 is connected to the support block 20 by means of pivotal journal means 83. The pivotal journal means 83 comprises a spherical bearing 110 having an inner race 111, an outer race 112 and bearings 113.

The upper end of the rocking segment 81 has a cut down portion 114 and shoulder 115 adjacent thereto, a threaded length 116 of smaller diameter and an unthreaded length 117 of still smaller diameter.

The inner race 111 of the spherical bearing 110 fits on the cut down portion 114 of the rocking segment 81. Annular spacer members 118 also fit on the cut down portion 114 above and below the inner race 111 with the lower annular spacer member 118 abutting the shoulder 115.

The outer race 112 fits into the central bore 67 of the support block 20 and is held in position by means of a snap ring 119 and spacer ring 120 positioned as a unit above and below the outer race 112.

Dust seals 121 seal the central bore 67 to prevent dust from collecting within the spherical bearing 110.

The spherical bearing 110 serves two important functions. First, it pivotally journals the rocking segment 81 to the support block 20. Second, it serves to transfer the load of a rotor from the upper end of the rocking segment 81 to the flexible reeds 18. Since the load of the rotor is transferred to the flexible reeds 18, the flexible coupling means 82 and the journals 85, 86 of the square journal block 42 are under slight, if any, thrust load.

Mounting means 21 includes a support plate 122 having a hub 123 with a threaded bore 124 therethrough. The support plate 122 is threaded on the threaded length 116 of the rocking segment 81 until it engages the upper annular spacer element 118. Further forceful turning of the support plate 122 results in a rigid positioning of the annular spacer elements 118 and the inner race 111. The mounting means 21 will be further described later in the specification.

It should be noted that the inner race 111 and hence the rocking segment 81 can pivot about a point indicated at B. Moreover the lower end of the rocking segment 81 rocks about the point A (see FIGURE 7). Hence the rocking segment 81 can oscillate in unison with the pair of flexible reeds 18 and the support block 20 in a direction substantially perpendicular to the common vertical plane 23. However, since the rocking segment 81 has two pivot points, A and B, it does not act as a vibratable reed as do the flexible reeds 18.

The drive shaft 19 is rigid and oscillates from its bottom about the point A. The flexible reeds 18, on the other hand are fixed at both ends and flex during oscillation of the rigid shaft 19. As a result, the relative angle ($a$) between the upper ends of the flexible reeds 18 and the support block 20 differs slightly from the relative angle ($b$) between the upper end of the rigid drive shaft 19 and the support block 20. The spherical bearing arrangement within the support block 20 accommodates this angular disparity about the pivot point B.

Mounting Means 21

The mounting means 21, as can be seen in FIGURE 1, further includes a balance plate 125 and rotor adapter 126 secured to the support plate 122.

The balance plate 125 serves as a convenient carrier upon which trial weights may be positioned for unbalance determinations.

The rotor adapter 126 may be of a variety of configurations and serves to adapt the rotor under investigation to the balancing support stand 15.

Drive Means

The drive means of the present invention is illustrated in FIGURES 3 and 5. As hereinbefore stated the drive means preferably comprises the variable speed motor 33. The motor 33 has the brake means 34 secured to the upper end of its shaft. The brake means 34 preferably comprises an electromagnetic brake mounted on the motor 33 according to the teachings of my copending application S.N. 163,169, filed December 29, 1961, and assigned to the assignee of the present invention.

The motor 33 further has the drive pulley 35 secured to the lower end of its shaft which is connected to the driven pulley 90 by means of the drive belt 36.

The motor 33 is secured to a motor mounting plate 127 which is secured to the vertical leg 45a of one of the brace elements 45 by any suitable means such as welding. The mounting plate 127 has horizontally disposed spaced slots 128 which receive bolts 129, extending through a base plate 130 of the motor 33, to cooperate with nuts 131 to rigidly secure the motor 33 to one face of the mounting plate 127. A nut 132 is threaded on each of the bolts 129 and is oriented so that it fits within the slot 129. Hence the flat sides of the nut 132 ride on the walls of the slot 128 and act as bearing elements. A washer plate 133 connects one vertically aligned pair of the bolts 129.

A belt tensioning means 134 is provided for adjusting the tension of the drive belt 36. The belt tensioning means 134 includes a movable angle 135 which has the other vertically aligned pair of the bolts 129 extending therethrough and a fixed angle 136 secured to the mounting plate 127. The angle members 135 and 136 each have a leg 135a, 136a projecting outwardly from the mounting plate 127. A bolt 137 has its head pivotally connected with the leg 136a of the fixed angle 136 and has its threaded body extending through the leg 135a of the moveable angle 135. A locking bolt 138 extends through the leg 136a and is threadedly engaged in the bolt 137.

To adjust the tension of the drive belt 36, the nuts 131 and the locking bolt 138 are loosened. The bolt 137 is then turned in the proper direction so that the entire motor 33 is moved to either increase or decrease the tension on the belt 36. When the tension has been adjusted the nuts 131 and the locking bolt 138 are retightened.

*Support Frame 17*

The support frame 17, illustrated in FIGURES 1 and 2, comprises a square base 140, a square top 141 and inclined legs 142. The square base 140 is secured on the base frame 16 and the inclined legs 142 extend upwardly to the square top 141. The support frame 17 presents four sides to which cover plates (not shown) may be attached to enclose and thus protect the internal components of the balancing support stand 15.

Supported by the square top 141 is the secondary frame 24 which has end members 143 and side member 144. The end members 143 are secured to clips 145 which are welded to the square top 141.

*Damping Means 25*

Figure 9:
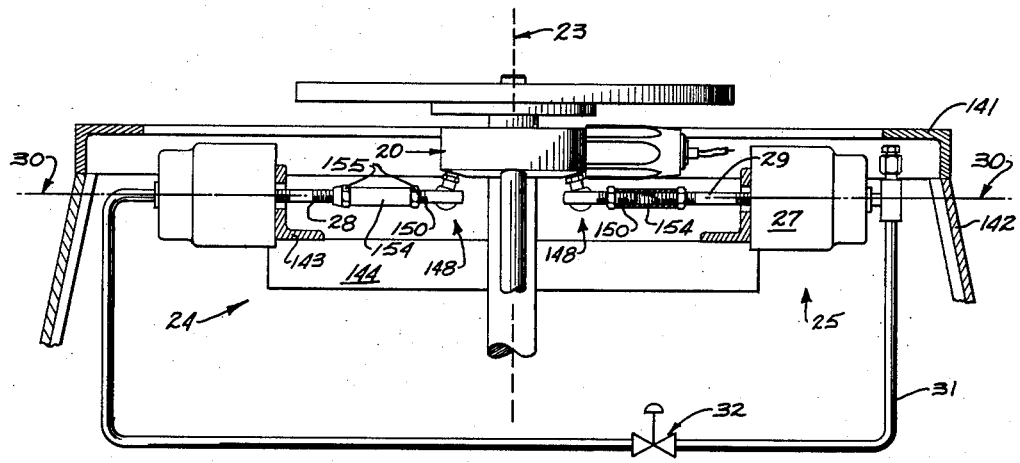
FIGURE 9 is a cross-sectional view taken along the line 9—9 of FIGURE 2 illustrating a damping means of the present invention.

The damping means 25 is illustrated in FIGURE 9. As hereinbefore described the damping means 25 includes the first and second dashpots 26, 27 secured in opposed relation to the end members 143 of the secondary frame 24. The piston shafts 28, 29 of the dashpots 26, 27 extend through the end members 143 toward the support block 20. The piston shafts 28, 29 are aligned on the common longitudinal axis 30 (dot-dash line) which is substantially perpendicular to the common vertical plane 23 (represented by a dashed line). Conduit means 31, connected at each end to one of the dashpots, provides communication between the dashpots 26, 27 for a working fluid. Valve means 32, schematically illustrated, is positioned in the conduit means 31 and serves to restrict the flow of the working fluid through the conduit means 31.

Pivot means 148 connects the piston shafts 28, 29 with the support block 20. The pivot means 148, illustrated in FIGURES 8 and 9, comprises a ring 149 having a threaded rod 150 extending therefrom and a ball 151 also having a threaded rod 152 extending therefrom. The threaded rod 152 is threaded into an opening 153 in the annular body 65 of the support block 20. The ball 151 is engaged in the ring 149 thus producing a pivot point. The threaded rod 150 is threaded into a sleeve 154 into which has also been threaded one of the piston shafts. Lock nuts 155 secure the sleeve 154 in a fixed position relative to the piston shafts and the threaded rod 150. The piston shafts 28, 29 are thus pivotally connected to the support block 20. Hence displacements of the support block 20 will cause the transfer of working fluid between the dashpots 26, 27.

It should be noted that the valve means 32 may be closed completely thereby causing the reeds 18 and the articulated drive shaft 19 to be locked in a vertical position so that a rotor may be secured to the mounting means 21.

In the absence of the damping means 25, the range of oscillations of the pair of flexible reeds 18 would be directly proportional to the forces produced by the imbalance of a rotating rotor. The presence of the damping means 25 provides an adjustable resisting force which limits the range of oscillations of the flexible reeds 18. The valve means 32 provides the resisting force by restricting the flow of the working fluid through the conduit means 31.

*Emergency Stop Elements*

If desired an emergency motor shut-off switch may be provided to stop the motor 33 in case the support block 20 is displaced beyond a predetermined distance. For example a microswitch 156, see FIGURE 2, may be secured to the end member 143 and so positioned in relation to one of the lock nuts 155, that when the length of travel of the lock nut 155 exceeds a predetermined value it will trip the microswitch 156 and stop the motor 33.

Still further a stop means may be provided that will physically stop the flexible reeds 18 from bending beyond a predetermined point. For example, a rubber stop 157, see FIGURE 2, secured to the side members 144 of the secondary frame 24 may be provided on each side of the flexible reeds 18. When the flexible reeds 18 bend a predetermined amount they will contact the rubber stops 157.

*Operation*

The operation of the balancing support stand 15 will now be described.

A rotor, as for example the grinding wheel 22, is rigidly secured to the rocking segment 81 by means of the mounting means 21. The motor 33 is then started. As the rotational speed of the rotor increases, its imbalance will produce forces which alternately deflect the pair of flexible reeds 18 in a direction perpendicular to the common vertical plane 23. The rocking segment 81 rocks about the rocking point A and oscillates in unison with the pair of flexible reeds 18.

The range of oscillations of the flexible reeds 18 depends upon the imbalance of the rotor and the rotational speed. The valve means 32 of the damping means 25 may be adjusted so that the range of oscillations is limited to a predetermined range.

When the rotor reaches the desired rotational speed, its imbalance may be investigated.

It should be evident from the foregoing detailed description that the present invention provides: a balancing support stand which utilizes a novel flexible reeds structure for supporting a rotor and which utilizes an articulated drive shaft for driving a rotor; a damping means that may be used (1) to lock a pair of flexible reeds in place when a rotor is to be secured to the balancing support stand, and (2) to limit the range of oscillation of a pair of flexible reeds; a balancing support stand that will accommodate rotors at relatively high, intermediate and relatively low rotational speeds; and a balancing support stand which utilizes a pair of flexible reeds and an articulated drive shaft which oscillate in unison in a direction substantially perpendicular to a common vertical plane defined by their axes.

According to the provisions of the patent statutes, I have explained the principle, preferred embodiment and mode of operation of my invention and have illustrated and described what I now consider to represent its best embodiment. However, I desire to have it understood that within the scope of the appended claims, the invention may be practiced otherwise than as specifically illustrated and described.

I claim:

1. In a balancing stand for determining the imbalance of a rotor, the combination comprising:
   a base,
   a pair of flexible reeds rigidly secured at one of their ends to the said base and extending therefrom in a common vertical plane;
   a support block rigidly secured to the other ends of the said pair of flexible reeds;

an articulated drive shaft disposed centrally between the said pair of flexible reeds and having
  a fixed segment journaled to the said base for rotation about a fixed axis lying in the said common vertical plane, and
  a rocking segment extending through the said support block and pivotally journaled therein,
  said articulated drive shaft being bendable at a rocking point between the said journals; and
mounting means for said rotor secured above the said support block to the said rocking segment of the said articulated drive shaft;
the axes of the said pair of flexible reeds and the said rocking segment of the said articulated drive shaft normally lying in the said common vertical plane;
the said pair of flexible reeds, the said support block, and the said rocking segment of the said articulated drive shaft being so related whereby they will oscillate in unison in a direction substantially perpendicular to the said common vertical plane.

2. The combination of claim 1 wherein the said pair of flexible reeds converge toward the said support block.

3. The combination of claim 1 including damping means comprising:
  frame means extending from the said base;
  a first dashpot secured to the said frame means and having a piston shaft extending toward the said support block;
  a second dashpot secured to the said frame and having a piston shaft extending toward the said support block;
  the said piston shafts of said first and second dashpots being substantially aligned on a common longitudinal axis, said common longitudinal axis being substantially perpendicular to the said common vertical plane;
  conduit means connecting the said first and second dashpots for communicating a fluid therebetween;
  valve means in said conduit means for restricting the flow of said fluid; and
  pivot means connecting each said piston shaft to said support block whereby displacements of said support block will cause the transfer of the fluid between the said dashpots.

4. The combination of claim 1 including a vibration transducer element secured to the said support block.

5. In a balancing stand for determining the imbalance of a rotor, the combination comprising:
  a base frame maintained spaced from a supporting surface;
  a pair of flexible reeds rigidly secured at one of their ends to the said base frame and extending therefrom in a common vertical plane;
  a support block rigidly secured to the other ends of the said pair of flexible reeds;
  an articulated drive shaft disposed centrally between the said pair of flexible reeds and having
    a fixed segment extending through said base frame and journaled thereon for rotation about a fixed axis lying in the said common vertical plane,
    a rocking segment extending through the said support block and pivotally journaled therein, and
    flexible coupling means connecting the said rocking segment to the said fixed segment, said articulated drive shaft being bendable about a rocking point defined by the said flexible coupling means; and
  mounting means for said rotor secured above the said support block to the said rocking segment of the said articulated drive shaft;
  the axes of the said pair of flexible reeds and the said rocking segment of said articulated drive shaft normally lying in the said common vertical plane;
  said pair of flexible reeds, the said support block and the said rocking segment of the said articulated drive shaft being so related whereby they will oscillate in unison in a direction substantially perpendicular to the said common vertical plane.

6. The combination of claim 5 wherein the said base frame comprises:
  a square peripheral frame;
  a square journal block for said fixed segment positioned at the center of said square peripheral frame;
  a first pair of spaced apart, substantially parallel brace elements extending inwardly from one pair of diagonally opposite corners of said square peripheral frame, the inner ends of said first pair of brace elements being secured to opposite sides of said square journal block;
  a second pair of spaced apart, substantially parallel brace elements extending inwardly from the other pair of diagonally opposite corners of said square peripheral frame, the inner ends of said second pair of brace elements being secured to opposite sides of said square journal block; and
  a pair of clamping blocks secured to the confronted faces of one said pair of brace elements, said pair of flexible reeds being rigidly secured at one of their ends in said clamping blocks.

7. The combination of claim 6 including:
  drive means secured to a brace element of the other of said pair of brace elements; and
  belt means connecting the said drive means in driving relation with the said fixed segment of the said articulated drive shaft, said belt means being positioned below the said base frame.

8. The combination of claim 5 wherein the said fixed segment of the said articulated drive shaft is a tubular member and the said flexible coupling comprises:
  a radial flange secured above the said base frame to said tubular member and having a plurality of spacer elements adjacent the outer edge thereof;
  an annular diaphragm having an inner edge and an outer edge, said annular diaphragm being secured at the said inner edge to the end of the said rocking segment of said articulated drive shaft and secured at the said outer edge to the said spacer members; and
  an elastomer element connecting the end of the said rocking segment to the said fixed segment.

9. The combination of claim 8 wherein the said elastomer element comprises.
  an extension member rigidly secured to the end of the said rocking segment, said extension member extending into the said tubular member; and
  a tubular plug of elastomeric material filling the annular recess formed between the said extension member and the said tubular member.

References Cited in the file of this patent
UNITED STATES PATENTS

| | | |
|---|---|---|
| 728,315 | Snell | May 19, 1903 |
| 2,054,267 | Ohlson | Sept. 17, 1936 |
| 2,926,529 | Hook | Mar. 1, 1960 |
| 2,968,185 | Jacobsen | Jan. 17, 1961 |
| 2,970,478 | Crawford et al. | Feb. 7, 1961 |
| 2,986,920 | Fibikar | June 6, 1961 |
| 3,034,361 | Karpchuk | May 15, 1962 |